(12) United States Patent
Nagarajan et al.

(10) Patent No.: US 11,652,664 B2
(45) Date of Patent: May 16, 2023

(54) MANAGING A SECOND RING LINK FAILURE IN A MULTIRING ETHERNET NETWORK

(71) Applicant: HEWLETT PACKARD ENTERPRISE DEVELOPMENT LP, Houston, TX (US)

(72) Inventors: Sivasankaran Nagarajan, Bangalore (IN); Yasser Salim Sait, Bangalore (IN); Venkatavaradhan Devarajan, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 74 days.

(21) Appl. No.: 17/221,807

(22) Filed: Apr. 4, 2021

(65) Prior Publication Data
US 2021/0328829 A1    Oct. 21, 2021

(30) Foreign Application Priority Data

Apr. 20, 2020   (IN) .............................. 202041016907

(51) Int. Cl.
| | | |
|---|---|---|
| *H04L 12/423* | (2006.01) | |
| *H04L 12/46* | (2006.01) | |
| *H04L 12/437* | (2006.01) | |
| *H04L 45/74* | (2022.01) | |
| *H04L 41/0604* | (2022.01) | |
| *H04L 12/42* | (2006.01) | |
| *H04L 101/622* | (2022.01) | |

(52) U.S. Cl.
CPC .......... *H04L 12/423* (2013.01); *H04L 12/437* (2013.01); *H04L 12/4625* (2013.01); *H04L 41/0627* (2013.01); *H04L 45/74* (2013.01); *H04L 2012/421* (2013.01); *H04L 2101/622* (2022.05)

(58) Field of Classification Search
CPC . H04L 12/423; H04L 12/437; H04L 12/4625; H04L 41/0627; H04L 45/74; H04L 2012/421; H04L 2101/622; H04L 12/42; H04L 41/0645; H04L 12/4641
See application file for complete search history.

(56) References Cited

U.S. PATENT DOCUMENTS

| | | | |
|---|---|---|---|
| 2016/0072640 A1* | 3/2016 | Yang | ..................... H04L 12/437 370/218 |
| 2018/0212828 A1* | 7/2018 | Sekhri | ................. H04L 12/4641 |

* cited by examiner

*Primary Examiner* — Charles C Jiang
*Assistant Examiner* — Shawn D Miller
(74) *Attorney, Agent, or Firm* — Hewlett Packard Enterprise Patent Department (57) ABSTRACT

Examples disclosed herein relate to managing a second ring link failure in a multi-ring Ethernet network. In an example, an inter-connection network node in a multi-ring Ethernet network comprising a major ring and a sub-ring may propagate a signal failure (SF) event, received in response to a second ring link failure in the major ring, to one or more nodes in the sub-ring. In response to receiving the SF event, a Ring Protection Link (RPL) on the sub-ring may be unlocked to allow network traffic through the RPL and avoid loop formation on the multi-ring Ethernet network. The sub-ring may be moved to the ring protection switching state, including performing a filtering database (FDB) flush at every node on the multi-ring Ethernet network whereby all MAC addresses and related port associations for traffic forwarding are cleared from the FDB.

20 Claims, 7 Drawing Sheets

MANAGING A SECOND RING LINK FAILURE IN A MULTIRING ETHERNET NETWORK

BACKGROUND

A ring network is a network topology in which each node connects to two other nodes, forming a single continuous circular data path. In a ring network, data packets travel from node to node, with each node along the way handling each data packet until it reaches the destination.

BRIEF DESCRIPTION OF THE DRAWINGS

For a better understanding of the solution, examples will now be described, with reference to the accompanying drawings, in which.

DETAILED DESCRIPTION

Ring topology is a way of connecting a group of network switches or LANs across, for example, a campus or city. Ethernet Ring Protection Switching (ERPS), defined in International Telecommunication Union-Telecommunication Standardization Sector (ITU-T) G.8032, provides protection and recovery switching for Ethernet traffic in a ring topology. Its objective is to avoid loop formation at the Ethernet layer by providing redundant path technology. ERPS helps achieve faster convergence to the order of a millisecond in the event of a link failure. ITU-T G.8032 defines the operation of ERPS protocol.

Each ring node in an Ethernet ring topology may be connected to adjacent ring nodes using two independent links. A ring link is bordered by two adjacent Ethernet ring nodes. Loop avoidance in an Ethernet ring may be achieved by blocking traffic on a predetermined link. This link is called as Ring Protection Link (RPL). Under normal circumstances this ring link is blocked, i.e. the link is not used for traffic. Thus, the traffic may flow on all ring links on the Ethernet ring except through RPL. RPL is blocked in one side by an Ethernet node called RPL owner. RPL owner blocks traffic over the RPL so that no loops are formed on the Ethernet ring. On the other side of the RPL, another Ethernet node is designated as RPL neighbor node RPL neighbor node is responsible for blocking its end of RPL. In ERPS, RPL owner and RPL neighbor may all be static configurations.

During an Ethernet ring failure condition, RPL owner node is responsible for unblocking its end of the RPL. RPL neighbor node may also participate by unblocking its end of the RPL. This allows the RPL to be used for network traffic. The failure of an Ethernet ring results in protection switching of the traffic. When any of the ring link fails, ring nodes adjacent to the failed link block the ports and start sending Ring Automatic Protection Switching Signal Failure (R-APS SF) messages. R-APS control messages are used to coordinate the activities of switching on and off the RPL link. Any failure along the ring triggers R-APS SF messages in both directions of the nodes adjacent to the failed link. On receiving this message, intermediate nodes do a MAC filtering database (FDB) flush, and RPL owner and neighbor nodes unblock the RPL link to enable the redundant path of the ring.

In a multi-ring (or ladder-network) Ethernet topology, network nodes may interconnect several rings to form interconnected ring networks. The node used for ring interconnection may be referred as an inter-connection network node, and links between them may be called shared link. Ethernet rings connected to another ring through interconnection network nodes may be called sub-rings. The ring to which a sub-ring is connected may be called major ring. A major ring is an Ethernet ring with a fully closed topology, whereas a sub-ring is an Ethernet ring that is not fully closed. To prevent loop formation, each ring (i.e. major ring and sub-ring) has its own RPL link. A shared link between two inter-connected nodes may be controlled by the major ring.

There may be scenarios involving double link failures in a multi-ring Ethernet network. In the event of a second ring link failure, a ring-split may occur that may render nodes in one part of the ring inaccessible to the nodes in the other part. The impact of the second ring link failure may depend on the failed ring link. In a worst case scenario, the second ring link failure may isolate a ring node that provides an upstream access for all nodes in the ring. These scenarios may also apply to a major ring that shares a shared link between inter-connected nodes with a sub-ring.

To address these technical challenges, examples are described herein to manage a second ring link failure in a multi-ring Ethernet network. In an example, an inter-connection network node in a multi-ring Ethernet network comprising a major ring and a sub-ring may propagate a signal failure (SF) event, received in response to a second ring link failure in the major ring, to one or more nodes in the sub-ring. In response to receiving the SF event, a Ring Protection Link (RPL) on the sub-ring may be unlocked to allow network traffic through the RPL and avoid loop formation on the multi-ring Ethernet network. The sub-ring may be moved to the ring protection switching state, including performing a filtering database (FDB) flush at every node on the multi-ring Ethernet network whereby all MAC addresses and related port associations for traffic forwarding are cleared from the FDB.

Examples are disclosed herein to protect an Ethernet ring across double failures that may involve a ring link failure across inter-connected nodes that connect a major ring with a sub-ring. In the event of a second ring link failure in a major ring where one of the failed links is a ring link between the inter-connected nodes, proposed examples may involve propagating a signal failure event to a sub-ring. The sub-ring may perform protection switching by unblocking the RPL link on the sub-ring. This avoids a ring-split in the event of double link failures on a major ring. It may also enable connectivity to all nodes in the major ring and the sub-ring by performing protection switching in the sub-ring.

Figure 1:
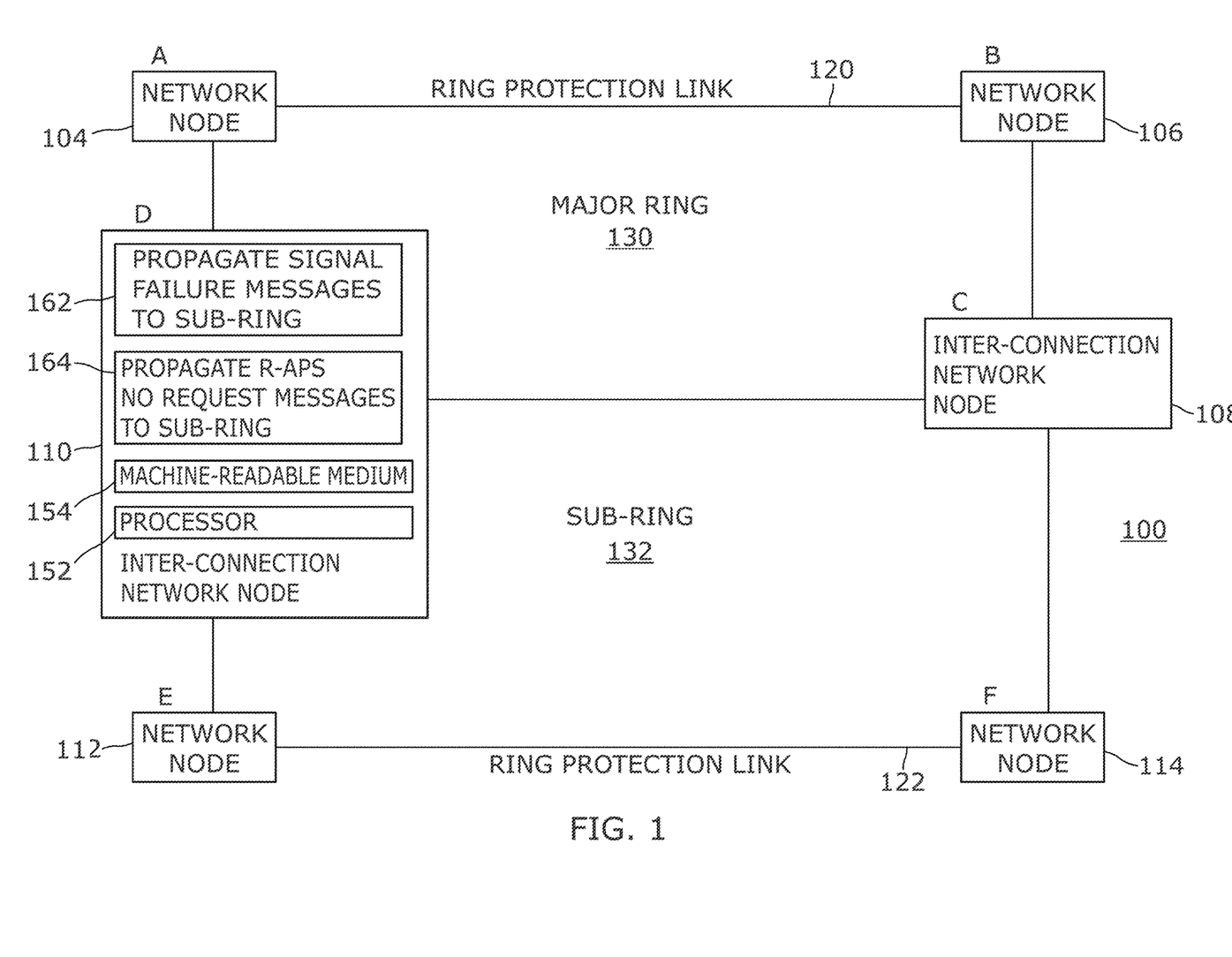
FIG. 1 is a block diagram of an example computing environment for managing a second ring link failure in a multi-ring Ethernet network.

FIG. 1 is a diagram of an example computing environment 100 for managing a second ring link failure in a multi-ring Ethernet network. Computing environment 100 may include a multi-ring Ethernet network comprising network nodes 104, 106, 108, 110, 112, and 114. Although six network nodes are shown in FIG. 1, other examples of this disclosure may include fewer or more than six network nodes in a multi-ring Ethernet network. In an example, network nodes in multi-ring Ethernet network may be organized into a major ring 130 and a sub-ring 132. In an example, the major ring 130 may comprise links AB, BC, CD, and DA between nodes 104, 106, 108, and 110. In an example, the sub-ring 132 may comprise links CF, FE, and ED between nodes 108, 112, and 114. Although one sub-ring 132 is shown in FIG. 1, other examples of this disclosure may include more than one sub-ring in a multi-ring Ethernet network. In the example of FIG. 1, sub-ring 132 is directly coupled to major ring 130. However, in some examples, a sub-ring may be indirectly coupled to a major ring, for instance, through another sub-ring. In an example, network nodes 104, 106, 108, 110, 112, and 114 may each implement ERPS protocol.

In an example, network nodes 104, 106, 108, 110, 112, and 114 may be communicatively coupled over a wired computer network. The computer network may include, for example, a Local Area Network (LAN), a Wide Area Network (WAN), a Campus Area Network (CAN), or the like. Further, the computer network may be a public network (for example, the Internet) or a private network (for example, an intranet). In an example, network nodes 104, 106, 108, 110, 112, and 114 may each be, for example, a network router, a network switch, or an L3 network device with L2 functionality.

In an example, to prevent loop formation, both major ring 130 and sub-ring 132 may each include a RPL link. Referring to FIG. 1, in an example, ring link AB may act as RPL link 120 in the major ring 130. Network node 106 may act as RPL owner and network node 104 may be RPL neighbor node on the other side of the RPL link AB. In an example, ring link EF 122 may act as RPL link in the sub-ring 132. Network node 114 may act as RPL owner and network node 112 may be RPL neighbor node on the other side of the RPL link FE. As mentioned earlier, the node used for ring interconnection may be referred as an inter-connection network node, and links between them may be called shared link. In the example of FIG. 1, network nodes 108 and 110 may be inter-connection network nodes that interconnect the major ring 130 and the sub-ring 132 in multi-ring Ethernet network. In an example, the shared link CD between two inter-connection network nodes 108 ("first inter-connection network node") and 110 ("second inter-connection network node") may be controlled by the major ring 130.

In an example, inter-connection network node 110 may include a processor 152 and a machine-readable storage medium 154 communicatively coupled through a system bus. Processor 152 may be any type of Central Processing Unit (CPU), microprocessor, or processing logic that interprets and executes machine-readable instructions stored in machine-readable storage medium 154. Machine-readable storage medium 154 may be a random access memory (RAM) or another type of dynamic storage device that may store information and machine-readable instructions that may be executed by processor 152. For example, machine-readable storage medium 154 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 154 may be a non-transitory machine-readable medium.

In an example, machine-readable storage medium 154 may store machine-readable instructions (i.e. program code) 162 and 164 that, when executed by processor 152, may at least partially implement some or all functions of inter-connection network node 110. Although the present example is described in context with inter-connection network node 110, similar logic or instructions may be applied to another inter-connection network node (e.g., 108).

Figure 2:
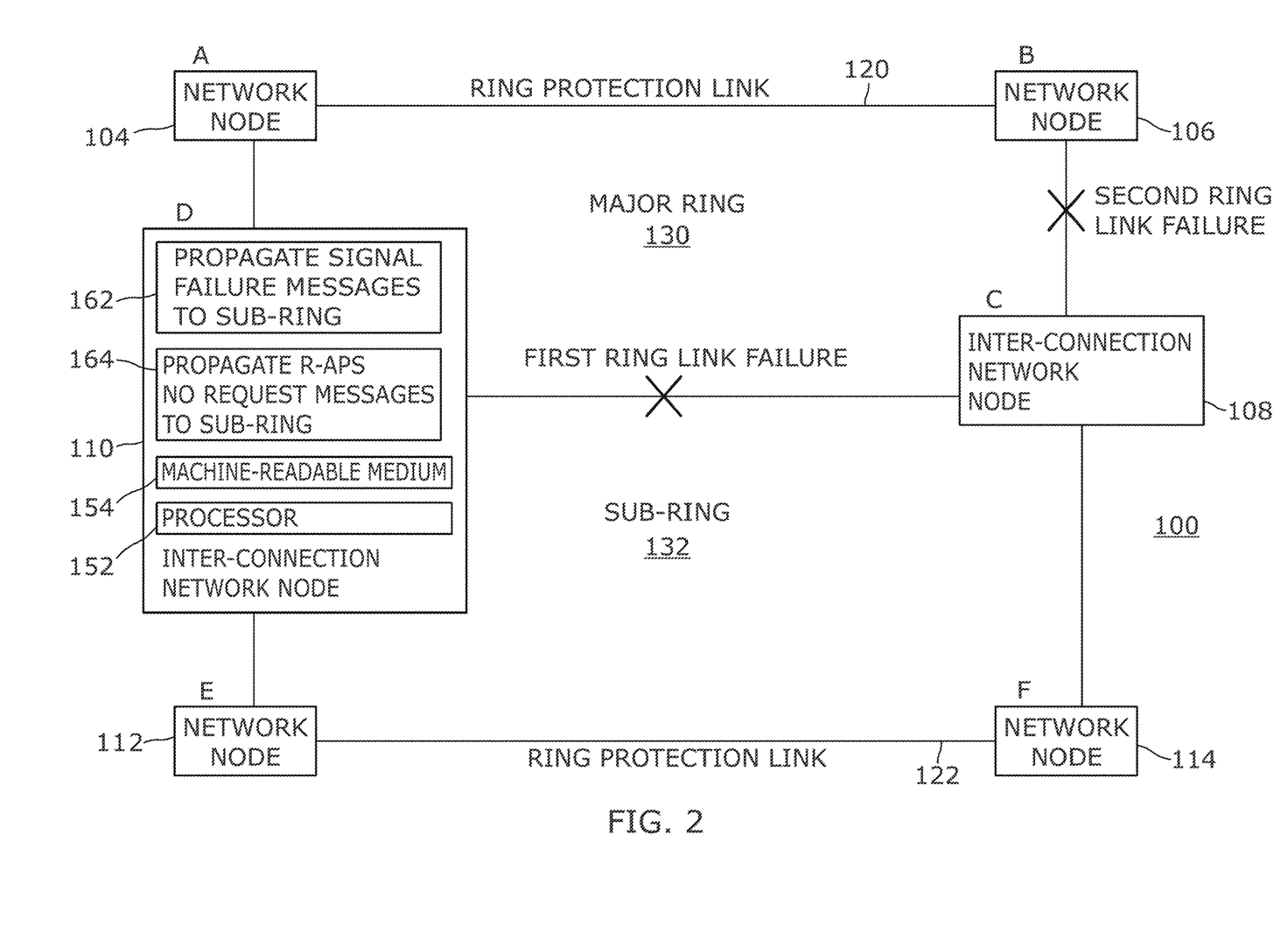
FIG. 2 is a block diagram of an example computing environment for managing a second ring link failure in a multi-ring Ethernet network.

In an example, inter-connection network nodes 108 and 110 may each be configured to propagate a signal failure (SF) event received in response to a second ring link failure in a major ring (e.g., 130) to one or more nodes of a sub-ring (e.g., 132) in a multi-ring Ethernet network. Referring to FIG. 2, in an example, a ring link (e.g., link CD) may fail in major ring 130, which may be referred as first ring link failure. In an example, the first ring link failure may pertain to a ring link between first inter-connection network node 108 and second inter-connection network node 110. Upon a first ring link failure in major ring 130, ring nodes (e.g., 108 and 110) adjacent to the failed link may start sending Ring Automatic Protection Switching Signal Failure (R-APS SF) messages (or "SF messages") periodically in both directions of the nodes adjacent to the failed link. The messages may be distributed over the ring. Each node that detects the failure blocks the port for the failed link and sends R-APS SF messages. On receiving this message, RPL owner node 106 and RPL neighbor node 104 on major ring 130 unblock the RPL link (e.g., link AB) to enable the redundant path of the ring. The major ring 130 may be moved to a protection switching state that includes performing a filtering database (FDB) flush at every node on the multi-ring Ethernet network whereby all MAC addresses and related port associations for traffic forwarding are cleared from the FOB. The protection switchover of the ring may be considered complete after RPL owner also performs an FDB flush, Once an FDB flush is complete, new FDB entries are added through source address learning from the network traffic.

In an example, a second ring link failure may occur in major ring 130, after a first ring link failure. Referring to FIG. 2, in an example, a second ring link (e.g., link BC) may fail in major ring 130, after a first ring link failure (e.g., link CD). Upon a second ring link failure in major ring 130, nodes (e.g., 106 and 108) adjacent to the failed link may start sending R-APS SF messages periodically in both directions of the nodes adjacent to the failed link. For example, upon second ring link failure (e.g., link BC), node 106 may send R-APS SF messages. On receiving a signal failure (SF) message, in response to the second ring link failure in the major ring 130, instructions 162 in inter-connection network node 110 may propagate R-APS SF messages to one or more nodes in sub-ring 132. Likewise, on receiving a signal failure (SF) message, in response to the second ring link failure in the major ring 130, inter-connection network node 108 may propagate R-APS SF messages to one or more nodes in sub-ring 132. In an example, propagating R-APS SF messages by inter-connection network node 110 may include sending R-APS SF messages with a sub-ring ID (identifying the sub-ring) on a sub-ring port. Likewise, in an example, propagating R-APS SF messages by inter-connection network node 108 may include sending R-APS SF messages with a sub-ring ID (identifying the sub-ring) on a sub-ring port.

On receiving R-APS SF message generated due to second ring link failure, RPL owner node 114 and RPL neighbor node 112 on sub-ring 132 may unblock the RPL link (e.g., link FE) to enable the redundant path of the ring. This allows network traffic through the RPL link FE and avoids loop formation on the multi-ring Ethernet network. The sub-ring 132 is moved to a protection switching state that includes performing a filtering database (FDB) flush at every node on the multi-ring Ethernet network whereby all MAC addresses and related port associations for traffic forwarding are cleared from the FDB.

When any of the failed link in major ring 130 recovers (i.e. upon restoration of the first ring link failure or the second ring link failure), the nodes adjacent to the restored link send R-APS No Request (R-APS NR) messages. On receiving these messages, instructions 164 on inter-connection network node 110 may forward them to sub-ring 132. Likewise, on receiving R-APS NR messages, inter-connection network node 108 may forward them to sub-ring 132. On obtaining R-APS NR message, the RPL owner on sub-ring 132 immediately blocks the RPL port, shall not honor the WTR timer for NR messages received from major ring, performs MAC FDB flush with the reception of NR, and sends R-APS no request, RPL blocked (R-APS NR, RB) messages. The R-APS NR, RB messages may trigger MAC FOB flush in the participating ring nodes in sub-ring 132. Inter-connection nodes may shall propagate topology change (TC) message in major-ring 130 with the reception of this NR-RB to trigger MAC FDB flush in the major-ring nodes. This causes all other nodes, other than RPL owner in the ring, to unblock all blocked ports. Recovery of the second failed link may be handled within major ring in the conventional way.

Figure 3:
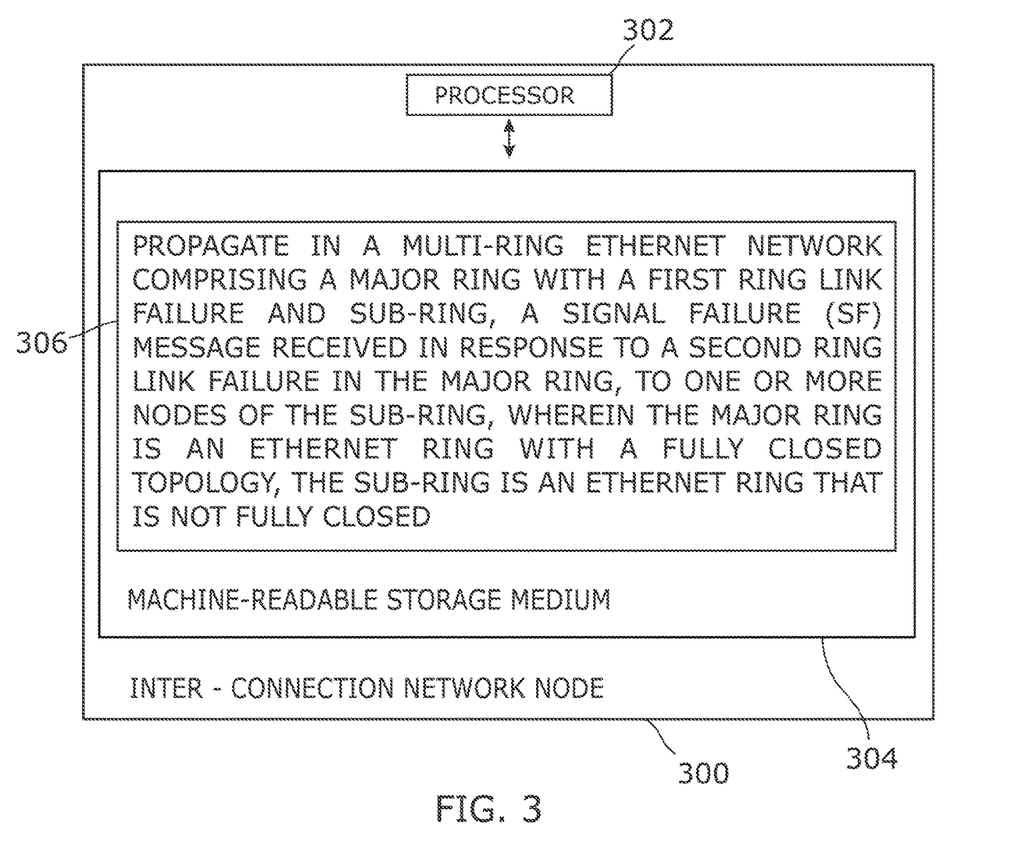
FIG. 3 is a block diagram of an example inter-connection network node for managing a second ring link failure in a multi-ring Ethernet network.

FIG. 3 is a block diagram of an example inter-connection network node 300 for managing a second ring link failure in a multi-ring Ethernet network.

In an example, inter-connection network node 300 may be analogous to inter-connection network node 108 or 110 of FIGS. 1 and 2, in which like reference numerals correspond to the same or similar, though perhaps not identical, components. For the sake of brevity, components or reference numerals of FIG. 3 having a same or similarly described function in FIG. 1 or 2 are not being described in connection with FIG. 3. Said components or reference numerals may be considered alike.

In an example, inter-connection network node 300 may include any type of network device capable of reading machine-executable instructions. Examples of the network device computing device may include, for example, a network router, a virtual router, a network switch, or a L3 network device with L2 functionality.

In an inter-connection network node 300 may include a processor 352 and a machine-readable storage medium 354 communicatively coupled through a system bus. Processor 352 may be any type of Central Processing Unit (CPU), microprocessor, or processing logic that interprets and executes machine-readable instructions stored in machine-readable storage medium 354. Machine-readable storage medium 354 may be a random access memory (RAM) or another type of dynamic storage device that may store information and machine-readable instructions that may be executed by processor 352. For example, machine-readable storage medium 354 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 354 may be a non-transitory machine-readable medium.

In an example, machine-readable storage medium 354 may store machine-readable instructions (i.e. program code) 306 that, when executed by processor 352, may at least partially implement some or all functions of primary source node.

In an example, inter-connection network node 300 may include instructions 306 to propagate, in a multi-ring Ethernet network comprising a major ring with a first ring link failure and a sub-ring, a signal failure (SF) message received in response to a second ring link failure in the major ring, to one or more nodes of the sub-ring, as described above. In an example, the major ring may include an Ethernet ring with a fully closed topology and the sub-ring may include an Ethernet ring that is not fully closed. The inter-connection network node 300 may provide an inter-connection between the major ring and the sub-ring. In response to receiving the SF message, a Ring Protection Link (RPL) on the sub-ring may be unblocked to allow network traffic through the RPL and avoid loop formation on the multi-ring Ethernet network. Further, the sub-ring may be moved to a ring protection switching state, as described above. And a filtering database (FOB) flush may be carried out at every node on the multi-ring Ethernet network whereby all MAC addresses and related port associations for traffic forwarding are cleared from the FOB, as described above.

Figure 4:
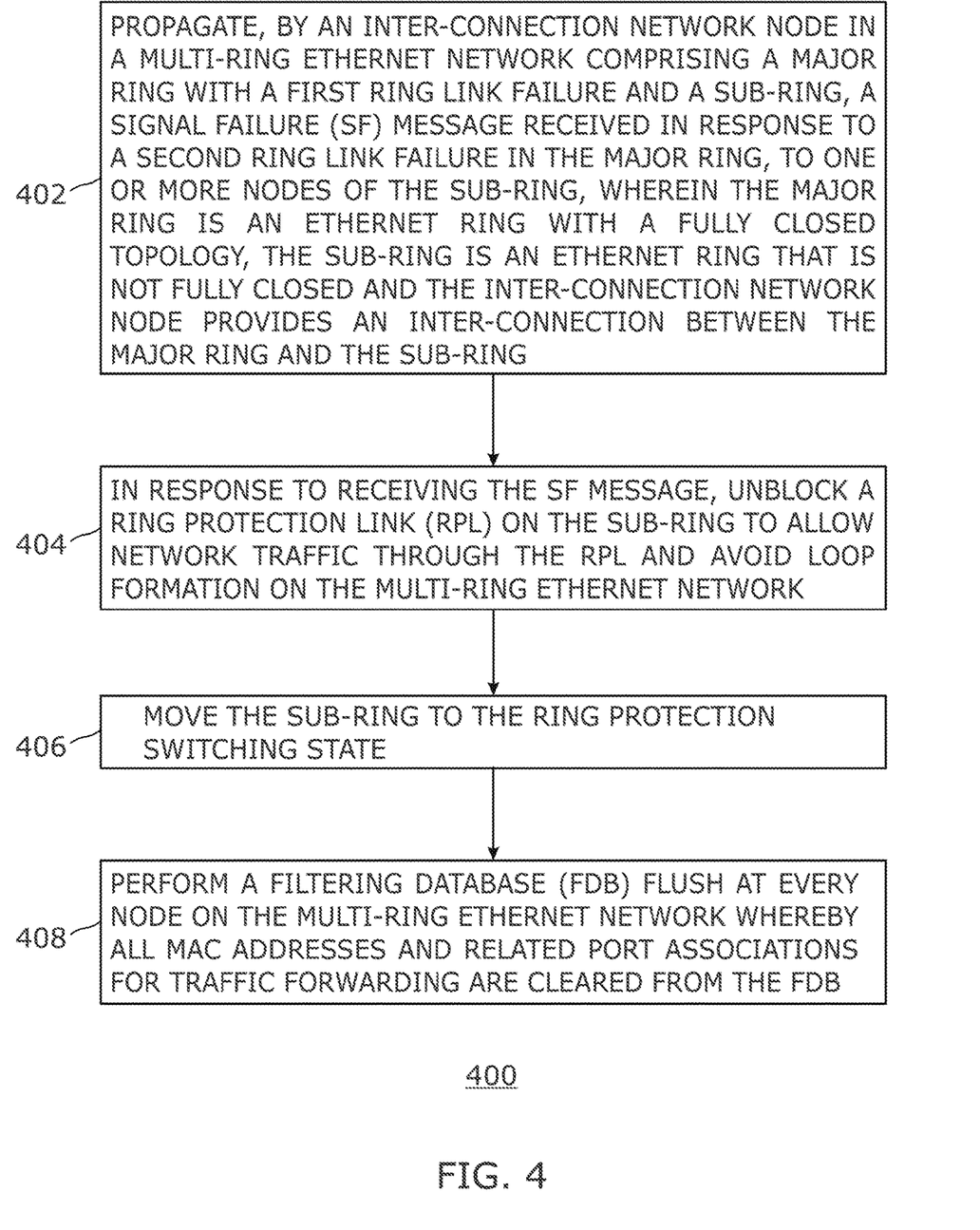
FIG. 4 is a block diagram of an example method of managing a second ring link failure in a multi-ring Ethernet network.

FIG. 4 is a block diagram of an example method 400 of managing a second ring link failure in a multi-ring Ethernet network. The method 400, which is described below, may be partially executed on an inter-connection network node analogous to inter-connection network node 108 or 110 of FIG. 1 or 2, or 300 of FIG. 3. However, other suitable network devices may execute method 400 as well. At block 402, an inter-connection network node in a multi-ring Ethernet network comprising a major ring with a first ring link failure and a sub-ring may propagate a signal failure (SF) message received in response to a second ring link failure in the major ring, to one or more nodes of the sub-ring, as described above. In an example, the major ring may include an Ethernet ring with a fully closed topology and the sub-ring may include an Ethernet ring that is not fully closed. The inter-connection network node may provide an inter-connection between the major ring and the sub-ring. At block 404, in response to receiving the SF message, a Ring Protection Link (RPL) on the sub-ring may be unblocked to allow network traffic through the RPL and avoid loop formation on the multi-ring Ethernet network. At block 406, the sub-ring may be moved to a ring protection switching state, as described above. At block 408, a filtering database (FDB) flush may be carried out at every node on the multi-ring Ethernet network whereby all MAC addresses and related port associations for traffic forwarding are cleared from the FDB, as described above.

Figure 5:
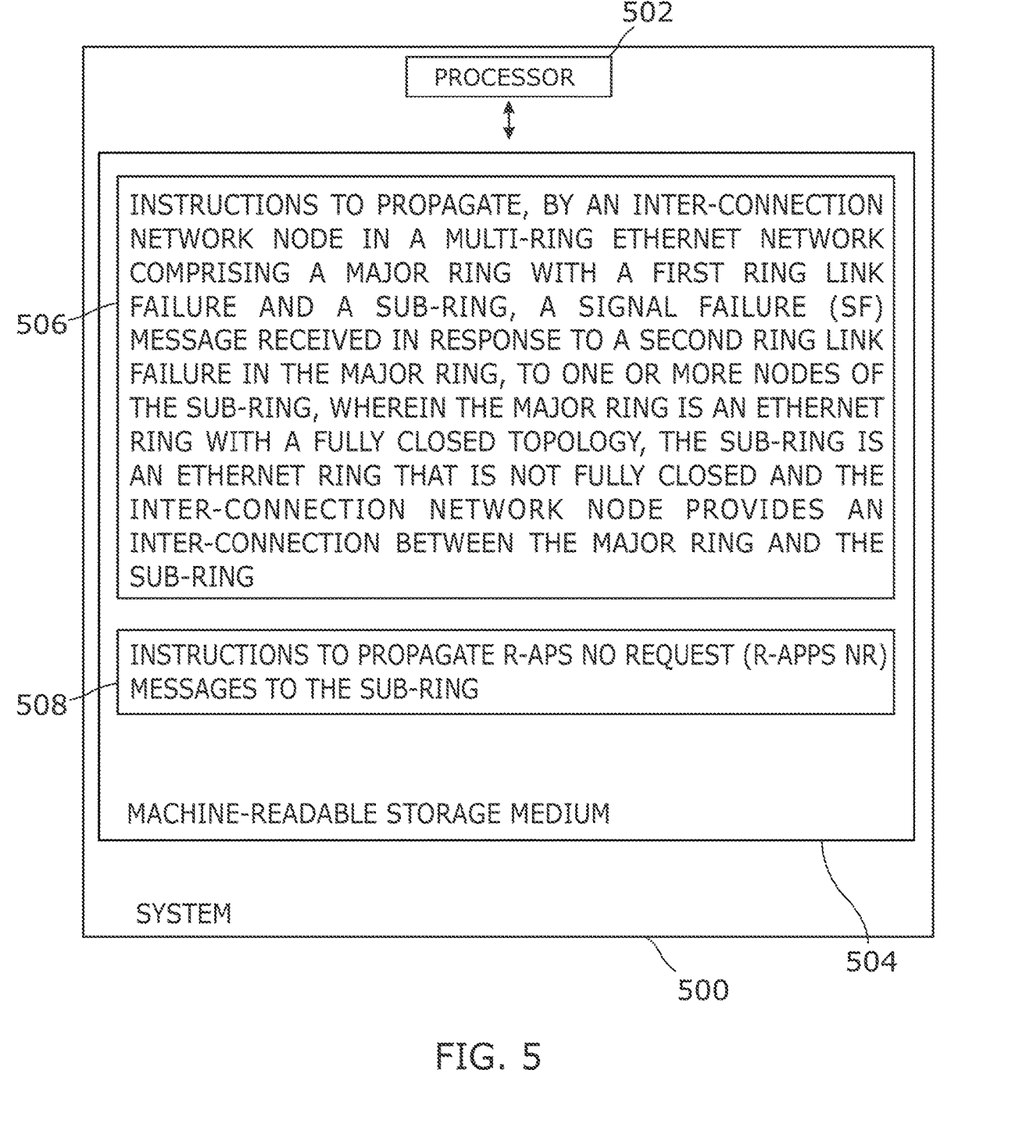
FIG. 5 is a block diagram of an example system including instructions in a machine-readable storage medium for managing a second ring link failure in a multi-ring Ethernet network.

FIG. 5 is a block diagram of an example system 500 including instructions in a machine-readable storage medium for managing a second ring link failure in a multi-ring Ethernet network. System 500 includes a processor 502 and a machine-readable storage medium 504 communicatively coupled through a system bus. In an example, system 500 may be analogous to inter-connection network node 108 or 110 of FIG. 1 or 2, or 300 of FIG. 3. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506 and 508.

In an example, instructions 506 may be executed by processor 502 to propagate, in a multi-ring Ethernet network comprising a major ring with a first ring link failure and a sub-ring, a signal failure (SF) message received in response to a second ring link failure in the major ring, to one or more nodes of the sub-ring, wherein the major ring is an Ethernet ring with a fully closed topology, the sub-ring is an Ethernet ring that is not fully closed and the inter-connection network node provides an inter-connection between the major ring and the sub-ring. In response to receiving the SF message, a Ring Protection Link (RPL) on the sub-ring may be unblocked to allow network traffic through the RPL and avoid loop formation on the multi-ring Ethernet network. The sub-ring may be moved to the ring protection switching state. A filtering database (FDB) flush may be performed at every node on the multi-ring Ethernet network whereby all MAC addresses and related port associations for traffic forwarding are cleared from the FDB.

Instructions 508 may be executed by processor 502 to propagate R-APS No Request (R-APS NR) messages to the sub-ring. The R-APS NR messages may be received, upon restoration of the first ring link failure or the second ring link failure, from nodes adjacent to restored link.

Figure 6:
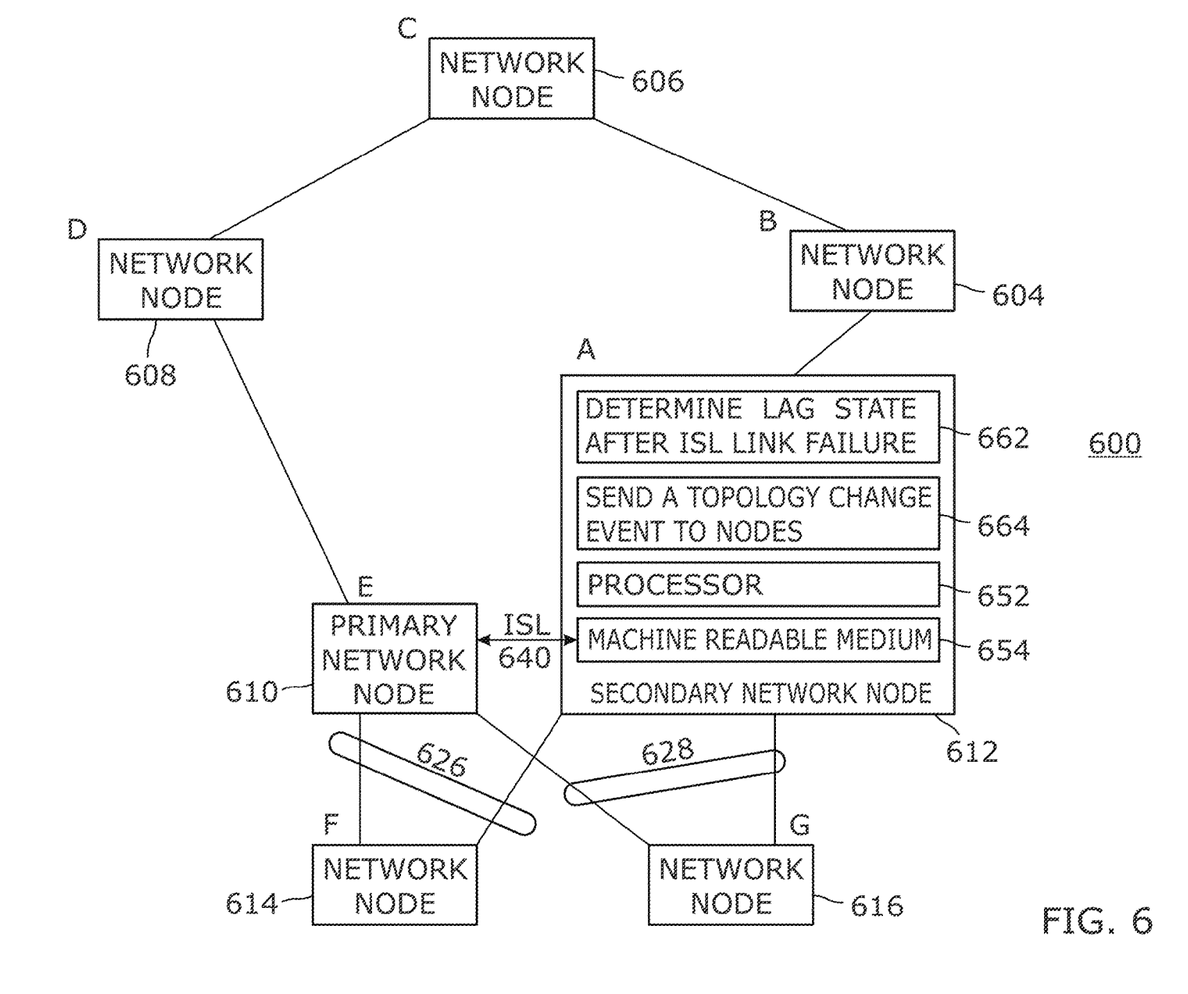
FIG. 6 is a block diagram of an example Ethernet ring network.

FIG. 6 is a block diagram of an example Ethernet ring network 600. Ethernet ring network 600 may comprise network nodes 604, 606, 608, 610, 612, 614, and 616 arranged in a ring topology. Although six network nodes are shown in FIG. 1, other examples of this disclosure may include fewer or more than six network nodes in the Ethernet network. In an example, network nodes 604, 606, 608, 610, 612, 614, and 616 may each implement ERPS protocol.

In an example, network nodes 604, 606, 608, 610, 612, 614, and 616 may be communicatively coupled over a wired computer network. The computer network may include, for example, a Local Area Network (LAN), a Wide Area Network (WAN), a Campus Area Network (CAN), or the like. Further, the computer network may be a public network (for example, the Internet) or a private network (for example, an intranet). In an example, network nodes 604, 606, 608, 610, 612, 614, and 616 may each be, for example, a network router, a network switch, or an L3 network device with L2 functionality.

In an example, to prevent loop formation Ethernet ring network 600 may include a RPL link. Referring to FIG. 6, in an example, ring link AB may act as RPL link 620 in the Ethernet ring network 600. Network node 604 may act as RPL owner and network node 612 may be RPL neighbor node on the other side of the RPL link AB.

In an example, virtualization technology may be used to present network nodes 610 and 612 as one virtual network node. The two network nodes 610 and 612 may appear as one device to partner downstream and/or upstream devices when forming a link aggregation group (LAG) with network nodes 610 and 612. Virtualization technology may be used to virtualize the control plane of two network nodes 610 and 612 to function as one device at layer 2 and as independent devices at layer 3. From a datapath perspective, each device may carry out an independent forwarding lookup to decide how to handle traffic.

In an example, virtualized network nodes 610 and 612 may each be configured with a role—primary or secondary. In an example, network node 610 may act as primary virtual node (also referred as primary network node) and network node 612 may act as secondary virtual node (also referred as secondary network node). The roles may not indicate which device is forwarding traffic at a given time since both network nodes may be in an active-active forwarding solution. The roles may be used to determine which device stays active when there is a split between the two network nodes (610 and 612), such as when a link between them goes down. In an example, the primary virtual node 610 is synced to the secondary virtual node 610.

In an example, network nodes 610 and 612 may provide redundant network connectivity via Link Aggregation Control Protocol link aggregation groups (LACP-LAG) 626 and 628. In an example, network nodes 610 and 612 may each run LACP to bundle interfaces associated with LAG links. The bundle may be treated as a single logical interface for network traffic forwarding.

In an example, a dedicated communication link may be established between network nodes 610 and 612 to share network packets. A recipient network device (e.g., network node 610 or network node 612) may share packets received by it with the other network device (e.g., network node 610 or network node 612, as the case may be). In an example, the packets may be transferred through a dedicated virtual LAN (VLAN) on Inter-Switch Link (ISL) 640. In an example, network nodes 610 and 612 may each run Inter-Switch Link (ISL) protocol to establish communication. ISL protocol may be use to maintain VLAN information in Ethernet frames as traffic flows between network nodes 610 and 612. Network nodes 610 and 612 may communicate network packets received via LAG, to each other on ISL. Some of the forwarding databases, such as the MAC and ARP tables, may be synchronized between network nodes 610 and 612. In an example, network nodes 610 and 612 may be inter-connection network nodes.

In an example, network node 612 may include a processor 652 and a machine-readable storage medium 654 communicatively coupled through a system bus. Processor 652 may be any type of Central Processing Unit (CPU), microprocessor, or processing logic that interprets and executes machine-readable instructions stored in machine-readable storage medium 654. Machine-readable storage medium 654 may be a random access memory (RAM) or another type of dynamic storage device that may store information and machine-readable instructions that may be executed by processor 652. For example, machine-readable storage medium 654 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium 654 may be a non-transitory machine-readable medium.

In an example, machine-readable storage medium 654 may store machine-readable instructions (i.e. program code) 662 and 664 that, when executed by processor 652, may at least partially implement some or all functions of network node 612.

In an example, if ISL fails, RPL ring link AB may be unblocked and network traffic may flow through the Ethernet ring network 600. Secondary virtual node 612 may wait for three seconds (default dead interval) to determine whether ISL failure is due to link failure or primary virtual node 610 failure. If primary virtual node 610 is alive, secondary LAG links may be blocked. During this dead interval period of three seconds, traffic from downlink switch may hash on both legs of lag links and traffic that switches through secondary virtual node 612 to the Ethernet ring 600 may create MAC learns in those directions. Subsequently, when secondary virtual node is blocked after three seconds, traffic destined to those MACs may be dropped at secondary virtual node 612. In an example, instructions 662 may be executed whereby ERPS protocol in secondary virtual node 612 may listen to secondary virtual node's 612 LAG state after ISL failure. In response to a determination by ERPS protocol that secondary LAG links have been blocked (i.e. the status of secondary LAG links is changed to a blocked state), instructions 664 may be executed by secondary virtual node 612 to send a topology change (TC) event to all nodes in the Ethernet ring network 600. In response, on receipt of the TC event, nodes on the Ethernet ring network 600 may each carry out a MAC filtering database (FDB) flush whereby all MAC addresses and related port associations for traffic forwarding are cleared from the FDB to clear stale MACs, as described above.

Figure 7:
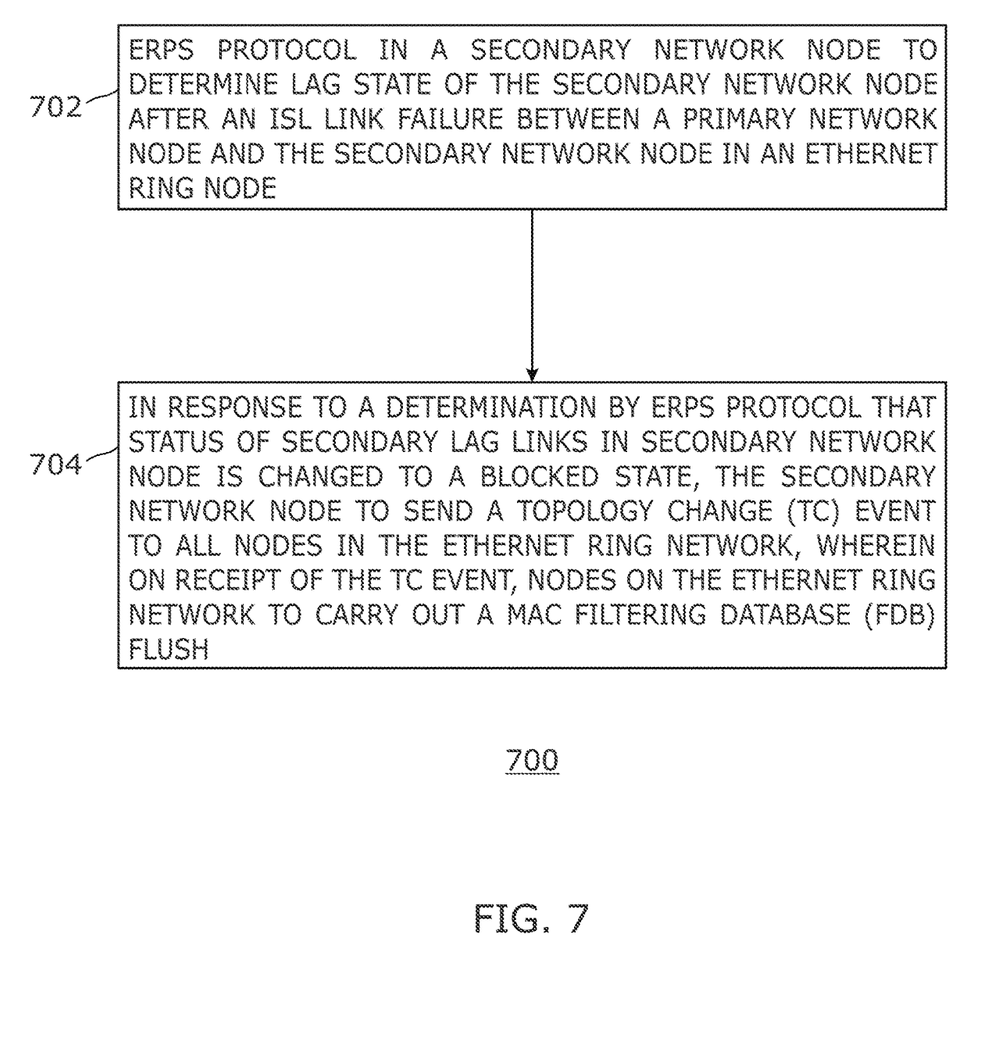
FIG. 7 is a block diagram of an example method of managing a link failure in an Ethernet ring network.

FIG. 7 is a block diagram of an example method 700 of managing a link failure in an Ethernet ring network. The method 700, which is described below, may be partially executed on a network node analogous to a network node (e.g. 104, 106, 108, 110, 112, or 114) of FIG. 1 or network node (e.g., 604, 606, 608, 610, 612, 614, and 616) of FIG. 6. However, other suitable network devices may execute method 700 as well. At block 702, ERPS protocol in a secondary network node (e.g., 612) may listen to the secondary network node's LAG state after an ISL link failure between a first network node (e.g., 610) and the secondary network node in an Ethernet ring node (e.g., 600). At block 704, in response to a determination by ERPS protocol that secondary LAG links have been blocked (i.e. the status of secondary LAG links is changed to a blocked state), the secondary virtual node 612 may send a topology change (TC) event to all nodes in the Ethernet ring network (e.g., 600). In response, on receipt of the TC event, nodes on the Ethernet ring network (e.g., 600) may each carry out a MAC filtering database (FDB) flush whereby all MAC addresses and related port associations for traffic forwarding are cleared from the FDB to clear stale MACs, as described above.

For the purpose of simplicity of explanation, the example method of FIGS. 4 and 7 are shown as executing serially, however it is to be understood and appreciated that the present and other examples are not limited by the illustrated order. The example systems of FIGS. 1, 2, 3, 5, and 6, and methods of FIGS. 4 and 7 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration. Although the solution has been described in conjunction with a specific example thereof, numerous modifications may be possible without materially departing from the teachings of the subject matter described herein. Other substitutions, modifications and changes may be made without departing from the spirit of the present solution. All of the features disclosed in this specification (including any accompanying claims, abstract and drawings), and/or all of the parts of any method or process so disclosed, may be combined in any combination, except combinations where at least some of such features and/or parts are mutually exclusive.

The invention claimed is:

1. A method, comprising:
propagating, by a node in a multi-ring Ethernet network comprising a major ring with a first ring link failure and a sub-ring, a signal failure (SF) message to one or more nodes of the sub-ring, wherein the SF message is received in response to a second ring link failure in the major ring, wherein the major ring is an Ethernet ring with a closed topology and the sub-ring is an Ethernet ring that is not fully closed, and wherein the node couples the major ring and the sub-ring to each other;
in response to receiving the SF message, unblocking a Ring Protection Link (RPL) on the sub-ring to allow network traffic through the RPL and avoid loop formation on the multi-ring Ethernet network;
moving the sub-ring to a ring protection switching state; and
performing a flush operation on a filtering database (FDB) at a respective node of the multi-ring Ethernet network for clearing MAC addresses and related port associations from the FDB of the node.

2. The method of claim 1, wherein unblocking the RPL on the sub-ring further comprises unblocking of the RPL by an RPL owner node and an RPL neighbor node of the sub-ring.

3. The method of claim 1, wherein propagating the SF message further comprises sending the SF message with a sub-ring identifier via a sub-ring port.

4. The method of claim 1, wherein the SF message indicating the second ring link failure is received at the node from another node on the major ring.

5. The method of claim 1, wherein the multi-ring Ethernet-network includes one or more additional sub-rings.

6. The method of claim 1, wherein the sub-ring is further coupled to the major ring through another sub-ring.

7. A node, comprising:
a processor; and
a machine-readable medium storing instructions that, when executed by the processor, cause the processor to:
propagate, in a multi-ring Ethernet network comprising a major ring with a first ring link failure and a sub-ring, a signal failure (SF) message to one or more nodes of the sub-ring, wherein the SF message is received in response to a second ring link failure in the major ring, wherein the major ring is an Ethernet ring with a closed topology and the sub-ring is an Ethernet ring that is not fully closed, and wherein the node couples the major ring and the sub-ring to each other;

in response to receiving the SF message, unblock a Ring Protection Link (RPL) on the sub-ring to allow network traffic through the RPL and avoid loop formation on the multi-ring Ethernet network;

move the sub-ring to a ring protection switching state; and perform a flush operation on a filtering database (FDB) at a respective node of the multi-ring Ethernet network for clearing MAC addresses and related port associations from the FDB of the node.

8. The node of claim 7, wherein the node is one of: a physical switch and a virtual switch.

9. The node of claim 7, wherein the major ring includes an RPL link independent of the RPL link on the sub-ring, and wherein the major ring is in a ring protection switching state due to the first ring link failure.

10. The node of claim 7, wherein the first ring link failure relates to a ring link between the node and another node in the major ring.

11. A non-transitory machine-readable storage medium comprising instructions, the instructions executable by a processor of an inter-connection network node to:

propagate, from a node in a multi-ring Ethernet network comprising a major ring with a first ring link failure and a sub-ring, a signal failure (SF) message to one or more nodes of the sub-ring, wherein the SF message is received in response to a second ring link failure in the major ring, wherein the major ring is an Ethernet ring with a closed topology and the sub-ring is an Ethernet ring that is not fully closed, and wherein the node couples the major ring and the sub-ring to each other;

in response to receiving the SF message, unblock a Ring Protection Link (RPL) on the sub-ring to allow network traffic through the RPL and avoid loop formation on the multi-ring Ethernet network;

move the sub-ring to a ring protection switching state; and perform a flush operation on a filtering database (FDB) at a respective node of the multi-ring Ethernet network for clearing MAC addresses and related port associations from the FDB of the node.

12. The non-transitory storage medium of claim 11, wherein the major ring includes an RPL link independent of the RPL link on the sub-ring, and wherein the major ring is in a ring protection switching state due to the first ring link failure.

13. The non-transitory storage medium of claim 11, wherein the sub-ring includes a logical sub-ring instance.

14. The non-transitory storage medium of claim 11, wherein the instructions to unblock the RPL on the sub-ring further comprise instructions to unblock the RPL by an RPL owner node and an RPL neighbor node of the sub-ring.

15. The non-transitory storage medium of claim 11, wherein the instructions to propagate the SF message further comprise instructions to send the SF message with a sub-ring identifier via a sub-ring port.

16. The non-transitory storage medium of claim 11, wherein the SF message indicating the second ring link failure is received at the node from a another node of the major ring.

17. The non-transitory storage medium of claim 11, further comprising instructions to propagate Ring Auto Protection Switching (R-APS) No Request (R-APS NR) messages to the sub-ring, wherein the R-APS NR messages are received, upon restoration of the first ring link failure or the second ring link failure, from nodes adjacent to a restored link.

18. The method of claim 1, wherein the major ring includes an RPL link independent of the RPL link on the sub-ring, and wherein the major ring is in a ring protection switching state due to the first ring link failure.

19. The method of claim 1, further comprising propagating Ring Auto Protection Switching (R-APS) No Request (R-APS NR) messages to the sub-ring, wherein the R-APS NR messages are received, upon restoration of the first ring link failure or the second ring link failure, from nodes adjacent to a restored link.

20. The node of claim 7, wherein the instructions, when executed by the processor, cause the processor further to propagate Ring Auto Protection Switching (R-APS) No Request (R-APS NR) messages to the sub-ring, wherein the R-APS NR messages are received, upon restoration of the first ring link failure or the second ring link failure, from nodes adjacent to a restored link.

* * * * *